United States Patent [19]

Katz

[11] Patent Number: 5,974,120

[45] Date of Patent: *Oct. 26, 1999

[54] TELEPHONE INTERFACE CALL PROCESSING SYSTEM WITH CALL SELECTIVITY

[75] Inventor: Ronald A. Katz, Los Angeles, Calif.

[73] Assignee: Ronald A. Katz Technology Licensing, L.P., Los Angeles, Calif.

[ * ] Notice: This patent is subject to a terminal disclaimer.

[21] Appl. No.: 08/480,185

[22] Filed: Jun. 7, 1995

Related U.S. Application Data

[63] Continuation of application No. 08/132,062, Oct. 4, 1993, Pat. No. 5,828,734, which is a continuation of application No. 07/779,762, Oct. 21, 1991, Pat. No. 5,251,252, which is a continuation of application No. 07/425,779, Oct. 23, 1989, Pat. No. 5,128,984, which is a continuation-in-part of application No. 07/312,792, Feb. 21, 1989, Pat. No. 5,073,929, which is a continuation-in-part of application No. 07/194,258, May 16, 1988, Pat. No. 4,845,739, which is a continuation-in-part of application No. 07/018,244, Feb. 24, 1987, Pat. No. 4,792,968, which is a continuation-in-part of application No. 06/753,299, Jul. 10, 1985, abandoned, said application No. 08/132,062, is a continuation-in-part of application No. 08/306,751, Sep. 14, 1994, which is a continuation of application No. 08/047,241, Apr. 13, 1993, Pat. No. 5,351,285, which is a continuation of application No. 07/509,691, Apr. 16, 1990, abandoned, and a continuation-in-part of application No. 07/640,337, Jan. 11, 1991, which is a continuation of application No. 07/335,923, Apr. 10, 1989, which is a continuation of application No. 07/194,258, May 16, 1988, Pat. No. 4,845,739, which is a continuation-in-part of application No. 07/018,244, Feb. 24, 1987, Pat. No. 4,792,968, which is a continuation-in-part of application No. 06/753,299, Jul. 10, 1985, abandoned, said application No. 07/509,691, is a continuation-in-part of application No. 07/260,104, Oct. 20, 1988, Pat. No. 4,930,150, which is a continuation-in-part of application No. 07/018,244, Feb. 24, 1987, Pat. No. 4,792,968, which is a continuation-in-part of application No. 06/753,299, Jul. 10, 1985, abandoned.

[51] Int. Cl.⁶ ................................................... H04M 11/00

[52] U.S. Cl. ..................................... 379/93.13; 379/93.12; 379/93.02

[58] Field of Search ................................ 379/92, 97, 142, 379/95, 207, 225, 127, 201, 211, 266, 265, 91, 93.13, 93.12, 91.01, 91.02, 92.01, 92.03, 93.02, 93.14, 88.16, 88.2

[56] References Cited

U.S. PATENT DOCUMENTS

| | | |
|---|---|---|
| 3,644,675 | 2/1972 | Waltington . |
| 4,054,756 | 10/1977 | Comella et al. . |

(List continued on next page.)

FOREIGN PATENT DOCUMENTS

| | | |
|---|---|---|
| 1162336 | 2/1984 | Canada . |
| 2009937-2 | 8/1990 | Canada . |

(List continued on next page.)

OTHER PUBLICATIONS

A page (p. 7) from literature on the Charles Schwab corporation, which is not dated nor identified (Exhibit A).

A page (p. 4) from an annual report dated Mar. 1, 1989, though the actual date on which the report was distributed to the public is unknown (Exhibit B).

(List continued on next page.)

*Primary Examiner*—Stella Woo
*Attorney, Agent, or Firm*—Lyon & Lyon LLP

[57] ABSTRACT

For use with a public telephone network CO incorporating a vast number of terminals Tl–Tn, a system CS limits and controls interface access to implement voice-digital communication for statistical processing. The system CS accommodates calls in different modes; e.g. "800", "900" or area code and incorporates qualifying apparatus to restrict against caller misuse. Alternative calling modes are used to reach an interface facility that also affords some control based on calling terminal identification, e.g. as by ANI equipment.

81 Claims, 2 Drawing Sheets

U.S. PATENT DOCUMENTS

| | | |
|---|---|---|
| 4,071,698 | 1/1978 | Barger, Jr. et al. . |
| 4,117,278 | 9/1978 | Ehrlich et al. . |
| 4,145,578 | 3/1979 | Orriss . |
| 4,162,377 | 7/1979 | Mearns . |
| 4,191,860 | 3/1980 | Weber . |
| 4,242,539 | 12/1980 | Hashimoto . |
| 4,335,207 | 6/1982 | Curtin . |
| 4,348,554 | 9/1982 | Asmuth . |
| 4,420,656 | 12/1983 | Freeman . |
| 4,555,594 | 11/1985 | Friedes et al. . |
| 4,559,415 | 12/1985 | Bernard et al. . |
| 4,580,012 | 4/1986 | Matthews et al. . |
| 4,582,956 | 4/1986 | Doughty ................................ 379/142 |
| 4,585,906 | 4/1986 | Matthews et al. . |
| 4,592,540 | 6/1986 | Fascenda et al. . |
| 4,611,094 | 9/1986 | Asmuth et al. . |
| 4,649,563 | 3/1987 | Riskin . |
| 4,652,998 | 3/1987 | Koza et al. . |
| 4,669,730 | 6/1987 | Small . |
| 4,694,490 | 9/1987 | Harvey et al. . |
| 4,697,282 | 9/1987 | Winter et al. . |
| 4,756,020 | 7/1988 | Fodale . |
| 4,757,267 | 7/1988 | Riskin . |
| 4,761,684 | 8/1988 | Clark et al. . |
| 4,763,191 | 8/1988 | Gordon et al. . |
| 4,764,666 | 8/1988 | Bergeron . |
| 4,785,408 | 11/1988 | Britton et al. . |
| 4,788,682 | 11/1988 | Vij et al. . |
| 4,788,715 | 11/1988 | Lee . |
| 4,788,718 | 11/1988 | McNabb et al. . |
| 4,797,910 | 1/1989 | Daudelin . |
| 4,797,911 | 1/1989 | Szlam et al. . |
| 4,797,913 | 1/1989 | Kaplan . |
| 4,815,741 | 3/1989 | Small . |
| 4,827,500 | 5/1989 | Binkerd et al. . |
| 4,842,278 | 6/1989 | Markowicz . |
| 4,850,007 | 7/1989 | Marino et al. . |
| 4,852,154 | 7/1989 | Lewis et al. . |
| 4,882,473 | 11/1989 | Bergeron et al. . |
| 4,894,857 | 1/1990 | Szlam et al. . |
| 4,897,867 | 1/1990 | Foster et al. . |
| 4,899,375 | 2/1990 | Bauer et al. . |
| 4,908,850 | 3/1990 | Masson et al. ...................... 379/88 |
| 4,922,522 | 5/1990 | Scanlon . |
| 4,937,853 | 6/1990 | Brule et al. . |
| 4,942,598 | 7/1990 | Davis . |
| 4,942,599 | 7/1990 | Gordon et al. . |
| 4,969,185 | 11/1990 | Dorst et al. . |
| 4,972,461 | 11/1990 | Brown et al. . |
| 4,989,233 | 1/1991 | Schakowsky et al. . |
| 4,996,705 | 2/1991 | Entenmann . |
| 5,018,736 | 5/1991 | Pearson et al. . |
| 5,023,904 | 6/1991 | Kaplan et al. . |
| 5,046,183 | 9/1991 | Dorst et al. . |
| 5,097,528 | 3/1992 | Gursahaney et al. . |
| 5,128,984 | 7/1992 | Katz ........................................ 379/92 |
| 5,146,491 | 9/1992 | Silver et al. . |
| 5,181,238 | 1/1993 | Medamana et al. . |
| 5,233,654 | 8/1993 | Harvey et al. . |
| 5,255,183 | 10/1993 | Katz . |
| 5,263,723 | 11/1993 | Pearson et al. . |
| 5,333,185 | 7/1994 | Burke et al. . |
| 5,353,335 | 10/1994 | D'Urso et al. . |

FOREIGN PATENT DOCUMENTS

| | | |
|---|---|---|
| 0 120 322 | 3/1984 | European Pat. Off. . |
| 0 568 114 A2 | 11/1993 | European Pat. Off. . |
| 0 229 170 B1 | 2/1994 | European Pat. Off. . |
| 0 620 669A1 | 10/1994 | European Pat. Off. . |
| 0 342 295 B1 | 3/1995 | European Pat. Off. . |
| 9002131 | 8/1990 | France . |
| 4005365 A1 | 8/1990 | Germany . |
| 63-500138 | 1/1988 | Japan . |
| 2-298158 | 12/1990 | Japan . |
| 3-41855 | 2/1991 | Japan . |
| 2 230 403 | 7/1993 | United Kingdom . |
| WO87/00375 | 1/1987 | WIPO . |
| WO89/02139 | 3/1989 | WIPO . |
| WO93/05483 | 3/1993 | WIPO . |

OTHER PUBLICATIONS

An early brochure based on a Mar., 1989, survey by Charles Schwab & Co., Inc, (Exhibit C).

A trademark scan (U.S. Federal) indicating a first date of use for Telebroker in Jun. 18, 1988 (Exhibit D).

"Machine Operation Manual", May 12, 1978, Issue 1, pp. 1–3, 9–10—(Manual).

Davey, J.P., "Dytel Western Region Sales Training Manual", 1985—(Manual).

Gutcho, Lynette, "DECtalk—A Year Later", *Speech Technology,* Aug./Sep. 1985, pp. 98–102—(Article).

Daniels, Richard, "Automating Customer Service", *Insurance Software Review,* Aug./Sep. 1989, pp. 60–62 —(Article).

Golbey, S.B., "Fingertip Flight Services", Oct. 1985—(Article).

"ARO Goes Pushbutton", *Newsletter,* Nov. 1985, p. 9—(Article).

"ROLM Centralized Attendant Services", *ROLM Corporation,* 1979.

"AIS, Versatile Efficient Information Service", *Fujitsu Limited,* 1972, pp. 153–162—(Brochure).

Smith, S.L., et al., "Alphabetic Data Entry Via the Touch–Tone Pad: A Comment", *Human Factors,* 1971, 13(2), pp. 189–190—(Book).

Holtzman, Henry, "Still an Infant Technology Voice Mail", *Modern Office Technology,* Jun. 1985, pp. 78–80, 82, 84, 90—(Article).

Leander, Monica, "Voice Response—A Technology for Solving Management Problems", *Speech Technology,* Mar./Apr. 1986, pp. 50–52—(Article).

Stolker, Bud, "CompuCorder speech storage and output device. (evaluation)", *Creative Computing,* Jul. 1983, pp. 1–7.

Witten, I.H., et al., "The Telephone Enquiry Service: a man–machine system using synthetic speech", *Int. J. Man–Machine Studies,* Jul. 1977, 9, pp. 449–464—(Book).

Gould, R.L., "Fidelity's Automated Voice Response System", *Telecommunications,* Jan. 1981, pp. 27–28—(Article)

"Fidelity Automated Service Telephone", *Fidelity Group,* 4 pages—(Manual).

Inquiry Letter To The F.C.C., From Attorneys For the Prior Title Holder Seeking Rulings That a Particular Game Would Not Be Considered a Lottery Under F.C.C. Regulations (Exhibit A).

Reply Letter From The F.C.C. To The Inquiry Lettery Stating The Requested Rulings (Exhibit B).

Basinger, R. G., et al., "Calling Card Service—Overall Description and Operational Characteristics", The Bell System Technical Journal, Sep., 1982.

Confalone, D. E., et al, "Calling Card Service—TSPS Hardware, Software, and Signaling Implementation", The Bell System Technical Journal, Sep., 1982.

Eigen, D.J., et al., "Calling Card Service—Human Factors Studies", The Bell Technical Journal, Sep., 1982.

Lexis Search, Nov. 1, 1984, re: System 85 Computer Process.

Lexis Search, Jan. 28, 1985, re: Rolm Releases Four–Channel Phonemail Voice Message Unit.

Cox, Jr., Floyd, "Flora Fax", Jan. 22, 1986–(Letter and Advertisements).

Moslow, Jim, "Emergency reporting system for small communities", *Telephony*, Feb. 11, 1985, pp. 30–32, 34—(Article).

Press Release: "AT&T 2: Reaches Agreement with Rockwell (ROK)," Aug. 26, 1986.

Adams, Cynthia, "Conversing With Computers", *Computerworld on Communications,* May 18, 1983, vol. 17, No. 20A, pp. 36–44—(Article).

Advertisement: Cuervo Gold Beach Chair, VoiceMail Int'l, '83.

Emerson, S.T., "Voice Response Systems—Technology to the Rescue for Business Users", *Speech Technology,* Jan./Feb. '93, pp. 99–103—(Article).

Martin, James, "Design of Man–Computer Dialogues", *IBM System Reseach Institute,* Chapter 16, pp. 283–306—(Chapter from a Book).

Kaiserman, D.B., "The Role Of Audio Response In Data Collection Systems", *Proceedings of the Technical Sessions,* Paleis des Expositions, Geneva, Switzerland, Jun. 17–19, 1980, pp. 247–251—(Article).

A.J. Waite, "Getting Personal With New Technologies For Telemarketers," DM News, Feb. 15, 1987, p. 50 on.

Yoshizawa, K., et al., "Voice Response System for Telephone Betting", *Hitachi Review,* Jun. 1977, vol. 26, No. 6—(Article).

Brady, R.L., et al., "Telephone Identifier Interface", *IBM Technical Disclosure Bulletin,* Oct. 1976, vol. 19, No. 5, pp. 1569–1571—(Article).

Mullen, R.W., "Telephone—home's 'friendliest' Computer", *Inside Telephone Engineer And Management,* May 15, 1985, vol. 89, No. 10,—(Article).

Winckelmann, W.A., "Automatic Intercept Service", *Bell Laboratories Record,* May 1968, vol. 46, No. 5, pp. 138–143—(Article).

Hester, S.D., et al., "The AT&T Multi–Mode Voice Systems—Full Spectrum Solutions For Speech Processing Applications", Sep. 1985, pp. 1–10—(Proceedings Of The 1985 AVIOS Conference).

Moosemiller, J.P., "AT&T's Conversant™ I Voice System" *Speech Technology,* Mar./Apr. 1986, pp. 88–93—(Article).

Frank, R.J., et al., "No. 4 ESS: Mass Announcement Capability", *The Bell System Technical Journal,* Jul./Aug. 1981, vol. 60, No. 6, Part 2, pp. 1049–1081—(Chapter from a Book).

"Chapter I General Description" *D.I.A.L. PRM/Release 3—Version 2* Mar. 1987 (Product Reference Manual).

Perdue, R.J., et al., "Conversant 1 Voice System: Architecture and Applications", *AT& T Technical Journal,* Sep./Oct. 1986—(Article).

Ozawa, Y., et al., "Voice Response System and Its Applications", *Hitachi Review,* Dec. 1979, vol. 28, No. 6, pp. 301–305—(Article).

Brochures (TWA Crew Scheduling/PSA's Reservation System/Universal Studios Program/Dow Phone): "AVIAR The communication system that keeps you flying", VoiceMail Int'l,—(Brochure).

"TWA Voicemail, Flight Attendants Users Guide" Aug. 1986,—(Brochure).

Holtman, Henry, "Voice Mail Soars At TWA", *Modern Office Technology* (Reprint), Mar. 1986,—(Article).

"Bid Results via Voicemail—Flight Deck Crew Members", May 1, 1985 (Script).

Borden, W.S., "Flight Attendant Self Input Of Monthly Bids Via Touch Tone Telephone", *In–Flight Services Bulletin,* Sep. 15, 1985—(Memo).

"Look Ma, no operators! Automatic voice system does many airline jobs", *Air Transport World,* Oct. 1986—(Article).

"1,000,000 Shares Common Stock" *Voicemail International, Inc.,* Jan. 10, 1984—(Public Offering Summary).

Levinson, S.E., et al., "A Conversational–Mode Airline Information and Reservation System Using Speech Input and Output", *The Bell System Technical Journal,* Jan. 1980, vol. 59, No. 1, pp. 119–137—(Chapter from a Book).

Corbett, A.J., "Telephone Enquiry System Using Synthetic Speech", *University of Essex,* Dec. 1974, (Thesis).

Sagawa, S., et al., "Automatic Seat Reservation By Touch–Tone Telephone", *Second USA Japan Computer Conference,* 1975, vol. 2, pp. 290–294—(Article).

TELEPHONE INTERFACE CALL PROCESSING SYSTEM WITH CALL SELECTIVITY

RELATED SUBJECT MATTER

This is a continuation of application Ser. No. 08/132,062, filed Oct. 4, 1993, and entitled "Telephone Interface Call Processing System With Call Selectivity", now U.S. Pat. No. 5,828,734, which is a continuation of application Ser. No. 07/779,762, filed Oct. 21, 1991, and entitled "Telephone Interface Call Processing System With Call Selectivity", now U.S. Pat. No. 5,251,252, which is a continuation of application Ser. No. 07/425,779, filed on Oct. 23, 1989, and entitled "Telephone Interface Call Processing System With Call Selectivity", now U.S. Pat. No. 5,128,984, which is continuation-in-part of application Ser. No. 312,792 filed Feb. 21, 1989, and entitled "Voice-Data Telephonic Control System" now U.S. Pat. No. 5,073,929, which is a continuation-in-part of application Ser. No. 07/194,258 filed May 16, 1988, and entitled "Telephonic-Interface Statistical Analysis System", now U.S. Pat. No. 4,845,739, which is a continuation-in-part of Application Ser. No. 07/018,244 filed Feb. 24, 1987, and entitled "Statistical Analysis System For Use With Public Communication Facility", now U.S. Pat. No. 4,792,968, which is a continuation-in-part of application Ser. No. 06/753,299 filed Jul. 10, 1985, and entitled "Statistical Analysis System For Use With Public Communication Facility", now abandoned. Also, said application Ser. No. 08/132,062 is a continuation-in-part of application Ser. No. 08/306,751, filed Sep. 14, 1994, and entitled "Multiple Format Telephonic Interface Control System", which is a continuation of application Ser. No. 08/047,241, filed Apr. 13, 1993, and entitled "Multiple Format Telephonic Interface Control System", now U.S. Pat. No. 5,351,285, which is a continuation of application Ser. No. 07/509,691, filed Apr. 16, 1990, now abandoned and a continuation-in-part of application Ser. No. 07/640,337, filed Jan. 11, 1991, and entitled "Telephonic-Interface Statistical Analysis System", which is a continuation of application Ser. No. 07/335,923, filed Apr. 10, 1989, which is a continuation of application Ser. No. 07/194,258, filed May 16, 1988, and entitled "Telephonic-Interface Statistical Analysis System", now U.S. Pat. No. 4,845,739, which is a continuation-in-part of application Ser. No. 07/018,244, filed Feb. 24, 1987, and entitled "Statistical Analysis System For Use With Public Communication Facility", now U.S. Pat. No. 4,792,968, which is a continuation-in-part of application Ser. No. 06/753,299, filed Jul. 10, 1985, and entitled "Statistical Analysis System For Use With Public Communication Facility", now abandoned, said application Ser. No. 07/509, 691, is a continuation-in-part of Ser. No. 07/260,104, filed Oct. 20, 1988, and entitled "Telephonic Interface Control System", now U.S. Pat. No. 4,930,150, which is a continuation-in-part of application Ser. No. 07/018,244, filed Feb. 24, 1987, and entitled "Statistical Analysis System for Use with Public Communication Facility", now U.S. Pat. No. 4,792,968, which is a continuation-in-part of application Ser. No. 06/753,299, filed Jul. 10, 1985, now abandoned.

BACKGROUND AND SUMMARY OF THE INVENTION

Recent years have seen a considerable growth in the use of telephonic communications. For example, in various applications, telecommunications applications have expanded to accommodate voice-digital interfaces between computer apparatus and callers at remote telephone terminals. For example, by actuating the push buttons at a remote telephone terminal, a caller controls a computer apparatus to provide various entertainment or information. In using such a system, a caller might telephone a financial service and selectively actuate the telephone key panel to receive information on specific stocks or bonds.

Digital interface systems also have been implemented to utilize digital signals provided independently of the caller's actions. For example, the so-called "ANI" telephone equipment provides digital signals indicating a caller's telephone number. Equipment designated "DNIS" is similarly available to indicate the called number. Thus, digital signals may be provided telephonically to a system associated with individual calling terminals as for identification or other use.

Telephonic games and contests are among the various applications that have been recognized for implementation with telephone interface systems. Such games and contests may be variously presented, as in cooperation with an advertising program for a product or in a lottery format. Generally with respect to such applications, various call modes might be utilized.

Essentially, three telephonic calling modes or services are in widespread use. Specifically, caller-charge or "900" service (including "976" calls) involves a charge to the caller for each call. The "900" calling mode is useful for implementing games and contests with telephone interface systems; however, certain problems are encountered. Specifically, certain telephone terminals, e.g. pay phones, do not accommodate "900" service. Also, with respect to certain forms of games and contests, it is important to offer members of the public an alternative "free" method of participation. In general, the system of the present invention may be employed to implement "900" calling modes while accommodating "free" participation with reasonable control.

Telephone calls may be accommodated without charge using "800" service or calling mode. Generally, the "800" calling mode accommodates free calls by callers in various areas to a particular station incurring the charges. In most applications, it is important to regulate the use of the "800" calling mode. Another calling mode is the traditional method of calling, involving area-code numbers which also includes calls placed within a given area code which do not usually involve a specific charge and usually do not require dialing the area code. One of the problems associated with using the area-code calling mode for interface systems is the vast number of calls. For example, even in association with an advertising campaign, inviting members of the general public to participate in a free contest or game by telephone may prompt an overwhelming response. Accordingly, a need exists for a practical system to control and limit calls to an interface service in the traditional free area-code number mode.

Another aspect of telephonic-interface contests involves zealous or obsessive participants. For example, in a quiz contest, a zealous person might call repeatedly, researching answers to given questions until ultimately a question is repeated. At that time, the caller is ready with an answer and has an unfair advantage in the contest. Thus, a need exists for control within the interface system.

In general, the system of the present invention involves a telephone call processing system for receiving calls from a multitude of terminals in different call modes and for processing calls, as to a game or contest format, with means to limit repeat-call advantages. In a disclosed form, the system implements three calling modes to facilitate various formats while accomplishing certain protection both with regard to the calling mode and contest formats.

BRIEF DESCRIPTION OF THE DRAWINGS

In the drawings, which constitute a part of this specification, exemplary embodiments exhibiting various objectives and features hereof are set forth, specifically.

DESCRIPTION OF THE ILLUSTRATIVE EMBODIMENT

As required, a-detailed illustrative embodiment of the present invention is disclosed herein. However, telephone techniques, physical communication systems, data formats and operating structures in accordance with the present invention may be embodied in a wide variety of forms and modes, some of which may be quite different from those of the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Figure 1:
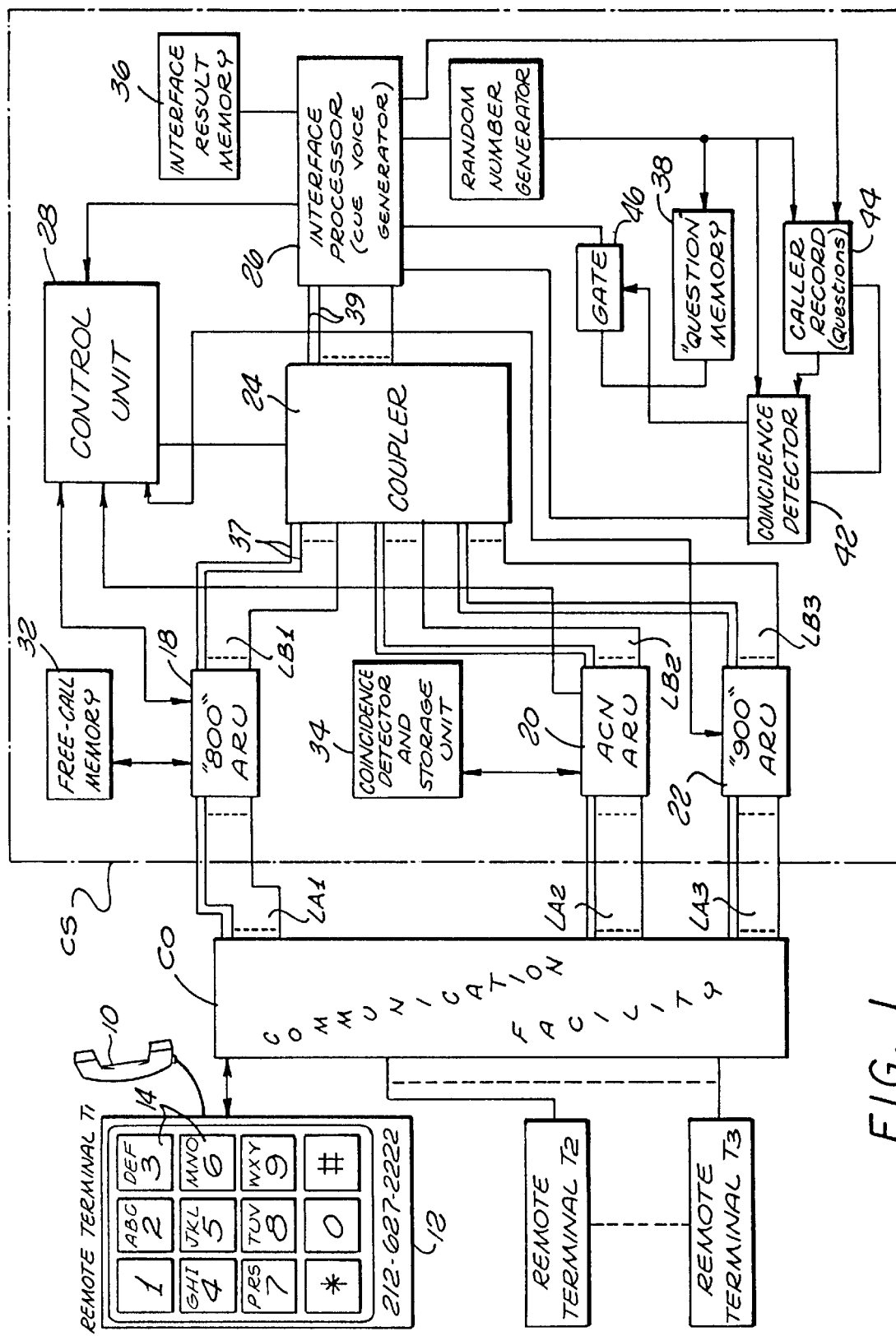
FIG. 1 is a block diagram of a system constructed in accordance with the present invention.

Referring initially to FIG. 1, a series of remote terminals T1–TN (telephone instruments) are represented (left). The terminals T1–TN may be functionally similar and accordingly only the terminal T1 is shown in any detail. The indicated terminals T1–TN represent the multitude of telephone terminals existing in association with a communication facility CO which may comprise a comprehensive public telephone network.

The communication facility CO, accommodating the individual terminals T1–TN, is coupled to a central processing station CS generally indicated within a dashed-line block. In the station CS, to illustrate operating aspects of the present invention, calls are selectively accepted and interfaced so as to accomplish a desired operating format, for example a contest or game.

Generally, calls from the individual terminals T1–TN might be in any of three modes, i.e. the "800" mode, the "900" mode or the area-code mode (traditional area code plus number or local number dialing). In the disclosed illustrative system, depending on individual calling modes, calls are selectively accepted for interface processing. Generally, the interface format accommodates "900" calls with supplemental "800" calls to accommodate both "free" access and all types of telephone terminals. In the disclosed embodiment, calls in the "800" mode are restricted in accordance with prearranged limitations. Furthermore, calls in the area-code mode (from all areas), the 800 mode and 900 mode may be limited to callers having a station number containing a predetermined digit sequence. For example, calls might be restricted to those from terminals having a telephone number ending in the digits "234".

The processing station CS also is controlled to limit the effectiveness of zealous callers. For example, in a contest formats callers may be quizzed with questions randomly drawn from an inventory. In accordance herewith, questions are not repeated to individual telephone terminals T1–TN. Thus, some control is imposed on an aggressive caller who might otherwise be given two opportunities to answer the same question.

Considering the system of FIG. 1 in greater detail, the exemplary telephone terminal T1 includes a handpiece 10 (microphone and earphone) and a panel 12 provided with a rectangular array of individual push buttons 14 in a conventional configuration. Of course, the handpiece 10 accommodates analog signals while the panel 12 is a digital apparatus. During an interface operation, as disclosed in detail below, the caller is queued or prompted vocally through the handpiece 10 (earphone) to provide digital responses using the buttons 14.

At this stage, some specific aspects of the communication interface are noteworthy. Essentially, as a result of telephonic dialing at one of the terminals T1–TN, the communication facility CO couples the select terminal to an audio response unit. Specifically, to illustrate various aspects, three separate audio response units are provided in the station CS to accept calls in the three distinct modes. That is, an audio response unit 18 receives calls in the "800" mode. An audio response unit 20 receives calls in the area-code dialing mode, and an audio response unit 22 receives calls in the "900" dialing mode.

It will be understood that although three separate audio response units are illustrated, systems incorporating the principles of the present invention may well incorporate various numbers of audio response units for each calling mode, with each audio response unit having the capability to accommodate a substantial number of calls as indicated by the lines from the communication facility CO in FIG. 1. Alternatively, a single composite unit might be utilized. Also, the mode or aspects of the described embodiment might well be implemented singly or in various combinations. Herein, for purposes of explanation, calls are treated individually and processed accordingly through the three audio response units 18, 20 and 22.

Generally, the audio response units 18, 20 and 22 connect callers at remote terminals T1–TN from the communication facility. CO through a coupler 24 (FIG. 1, station CS, center) to an interface processor 26. Both the coupler 24 and the processor 26 are connected to a control unit 28 that is also connected to the audio response units 18, 20 and 22. Accordingly, with overall supervision by the control unit 28, the audio response units 18, 20 and 22 answer and preliminarily qualify callers from the terminals T1–TN for connection through the coupler 24 to the interface processor 26.

Upon completion of an interface connection in the disclosed embodiment, a contest format is executed by vocally prompting callers to respond with digital data. At this point, it is noteworthy that the communication facility CO also provides identification signals to the audio response units 18, 20 and 22. Specifically, digital identification signals representing numbers associated with the calling terminals T1–TN are provided by "ANI" equipment independent of any action by the caller. In the event "ANI" equipment is not available, callers may be vocally prompted to provide the digital representations by selectively depressing the buttons 14.

The telephone communication facility CO also may provide digital signals indicating the called number. Generally, such a capability involves equipment designated "IDNIS". The capability may be useful in various embodiments of the present system, as to distribute calls from a single equipment as mentioned above.

Pursuing the exemplary structure of FIG. 1 in still greater detail, the communication facility CO provides three sets of trunks or lines LA1, LA2 and LA3 respectively coupled to the audio response units 18, 20 and 22. From the audio response units 18, 20 and 22, sets of lines LB1, LB2 and LB3 are connected to the coupler 24. Under control of the control unit 28, the coupler 24 connects individual lines 37 of the sets LB1, LB2 and LB3 to the processor 26 through lines 39.

Generally, the audio response units 18, 20 and 22 may take the form of well known telephonic structures with the capability to "answer" calls and interface callers in a preliminary way. Each of the units 18, 20 and 22 incorporate a voice generator along with some basic programmable logic capability.

The audio response unit 18 is coupled to a free-call memory 32. Generally, the unit 18 in cooperation with the memory 32 operates with the control unit 28 to qualify acceptable calls in the "800" mode.

The audio response unit 20 is connected to a select-number coincidence detector 34. These structures along with the control unit 28 test area-code mode calls. The audio response unit 22 accepts calls without initial qualification.

The system of the disclosed embodiment selectively qualifies callers depending on their calling mode. Additionally, the system responds to caller identification to enhance contest equity. Generally, the interface processor 26 poses questions to calling contestants and stores the resulting answers in a result memory 36. Questions given to contestants are selected from a memory 38 by a random number generator 40. Essentially, the memory 38 contains an inventory of questions addressable by numbers provided by the random number generator 40. The address numbers from the generator 40 are also supplied to a coincidence detector 42 that also receives the address numerals of questions previously presented to a specific caller from a record 44. Thus, before a question is presented to a caller, the number of the calling terminal is checked to assure that the same question has not previously been posed to a caller at that terminal.

If the coincidence detector 42 clears the, current question as not being repetitive, a gate 46 is qualified and the question is supplied from the memory 30 to the interface processor 26. A voice generator within the interface processor 26 then provides signals through a designated line 39, the coupler 24, a line 37, one of the audio response units and the communication facility CO to the connected remote terminal. As a result, the caller hears a simulated voice question. The answer is provided by the caller actuating the buttons 14 at the calling terminal. In that regard, the question may be in a multiple choice or true-false format to accommodate simple push button actions at the terminal, In view of the above description of structural elements in the disclosed embodiment, a comprehensive understanding of the system may now best be accomplished by assuming certain operating conditions and describing the resulting operations. Accordingly, assume that the system CS is programmed to accommodate a relatively simple game format, that is, a sponsored contest for the promotion of a product, erg. the XYZ widget. Further assume the contest is of limited participation based either upon: the payment of a token fee ("900" calling mode), prearranged participation ("800" calling mode), lottery selection (area-code calling mode) or lottery selection in combination with either 800 or 900 calling modes. Considering exemplary possibilities of the format, the XYZ Widget might be advertised with an invitation to participate via the "900" calling mode. Alternatively, participants might be variously qualified as by select notification; however, in the exemplary format, such participants would incur a token charge imposed through "900" telephonic service. To consider an example, an offering might be stated: "If your last three phone digits are 972 you may call, 1) if you wish, call 1 900 XXXX972 ($0.95 service charge) provided your last three phone digits are 972; 2) if you have written in for a 'free to enter' you can use the one-time PIN number provided your last three phone digits are 972. In this case you can use the 'free' 800 number provided to you with your PIN number."

As indicated above, some telephone terminals do not accommodate "900" calling mode. Also, under certain circumstances, it is important to afford members of the public "free" access to participate in various games or contests. For example, such participation might be arranged by mail or other communication to provide a participant with a limited-use (i.e. one) qualification number. With use, the numbers are stored in the memory 32 and the list is checked subsequently to avoid repeat use.

A third class of contest participants might be considered lottery winners. For example, the sponsor might televise a drawing of three decimal digits to provide a sequence of three numbers. The three numbers might identify "winning" or "entitled" participants by corresponding to the last three numbers (digits) of their telephone number. For example, the drawing of the numbers "257" would entitle a single call participation from any of the telephone terminals T1–TN designated by a number, the last three digits of which are "257".

In an exemplary contest format, participants might be asked a few test questions (for minor prizes and the ability to participate in a lottery). of course, a vast variety of possibilities exist; and in that regard, interim prizes may be awarded to participants as the format proceeds from the initial call to the ultimate prize. At the present point, it is important to appreciate that the system accommodates participants using various telephone call modes with select qualification to participate in an interface format utilizing voice prompt and push-button digital communication. In accordance with the described example, the sponsor invites participants to enter using "900" calling mode service. As a part of such an invitation, persons are advised that "free" entry or participation may be gained by sending a self-addressed envelope to receive an entry number, e.g. eight digits, for use via "800" calling mode service. In the disclosed embodiment, the eight-digit numeral is coded for verification. Of course, numerous possibilities exist. As a simple example the second and sixth digits of the number might have a specific sum, e.g. seven or seventeen. That is, the second and sixth digits might be: three and four, five and two, six and one, seven and zero, nine and eight and so on. A qualifying number would be: "34726313", the second and sixth digits being four and three, respectively.

With the arrangements completed for calling entries in the "900" and "800" mode, the contest might operate for several days before being opened to area-calling participants. That is, the area-calling mode might be available only after a televised drawing entitling participation from a select group of telephone numbers for a limited period of time.

Figure 2:
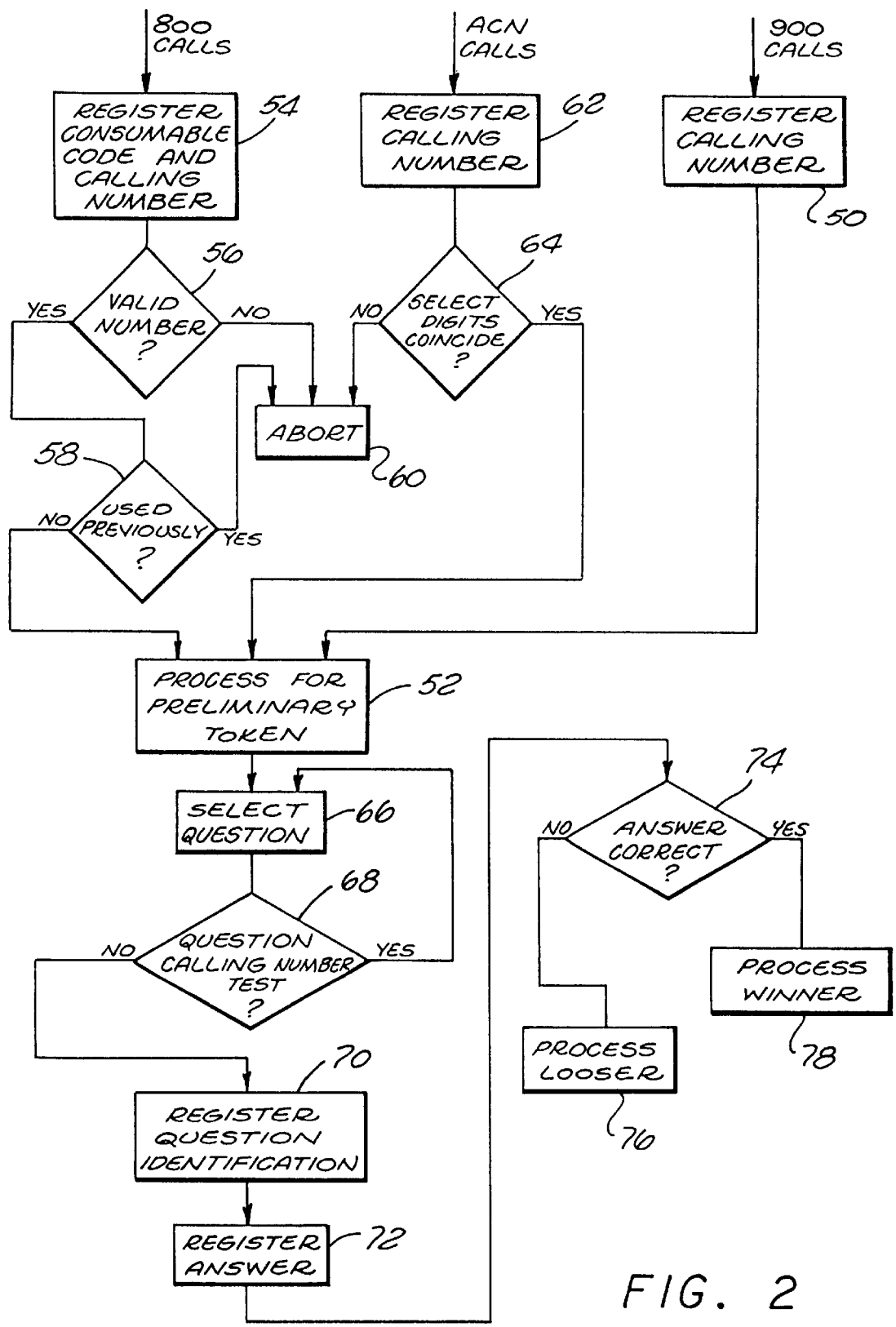
FIG. 2 is a flow diagram of an operating format of the system of FIG. 1.

In view of the above assumptions and descriptions, consider now the operation of the system as depicted in FIG. 1 in relation to the process diagram of FIG. 2. That is, assume the system of FIG. 1 is implemented and programmed to accommodate the exemplary operations as will now be described with reference to the process diagram of FIG. 2.

First, suppose a caller at the terminal T1 places a call in the "900" mode in response to an advertisement by a sponsor promoting XYZ Widgets. Perhaps the caller will receive at least a token gift and might qualify for a major lottery prize.

The assumed call involves the caller actuating the buttons 14 as for example to input: "1 900 5558945". As a result, signals are provided to the communication facility CO resulting in a connection from the remote terminal T1 to the audio response unit 22. With the connection, the communication system CO also provides the audio response unit 22 with digital identification signals representative of the designation for remote terminal T1 ("212 627 2222"). The identification signals are provided by the ANI equipment within the communication facility CO and are registered by the audio response unit 22. The operation is illustrated as a process step in FIG. 2 by the block 50 (upper right) for "900" mode calls.

As suggested above, it may be desirable for a format to provide a token award to all callers in the "900" mode. Recognizing, such particulars as possibilities, in the disclosed embodiment, calls in the "900" mode are passed through the audio response unit 22 (FIG. 1) and the coupler 24 to the interface processor 26. Accordingly, the interface processor 26 receives the calling number and processes the contest format as described in detail below.

The initial step of the format common to all call modes is represented by the block 52 in FIG. 2. However, as calls in all modes are processed similarly from that point, before proceeding with the explanation, the preliminary operations attendant other calling modes first will be explained.

As explained above, certain accommodations are made for participation in the "800" (caller free) mode. Accordingly, assume a caller at the terminal T1 has been given an identification number: "34726313" for use in the "800" mode. Accordingly, the caller dials a number, e.g. "800 555 3478", actuating the terminal T1 and the communication facility CO to provide a connection with the audio response unit 18. With communication, the audio response unit actuates an internal voice generator prompting the caller to key in his assigned number, "34726313". As the digits of the number are keyed in by the caller, they are supplied from the audio response unit 18 to the control unit 28 and the free-call memory 32.

Within the control unit 28, logic is provided for verifying the identification number as proper. In accordance with the simple example explained above, the control unit 28 would simply sum the second and sixth digits to test for a total of "7". The coincidence test is represented by the query block 56 in FIG. 2. A indicated above, various codes and verification techniques are well known along with the apparatus for verifying assigned numbers.

If the control-unit 28 validates the qualification number "34726313", it is recorded in the free-call memory 32 for future checking against repeat use. Accordingly, each call in the "800" mode also involves a check or test from the audio response unit 18 to the memory 32 to determine whether or not the assigned qualification number has been previously used. The previous-use test is illustrated as a process step by the query block 58 in FIG. 2.

If the control unit 28 determines the qualification number to be invalid or the memory 32 reveals the number has been previously used, the communication is aborted by the audio response unit 18. For example, the audio response unit 18 may be actuated to provide simulated audio signals carrying a message terminating the communication. For example, the caller might be advised: "The number you have provided is not valid. Consequently, your participation cannot be accepted on that basis."

If the entered number is valid and has not been previously used, the tests indicated by the query blocks 56 and 58 (FIG. 2) are positive and the process again proceeds to the common step as indicated by the block 52, e.g. as to receive a token gift.

As indicated above, a third possibility for contest participation involves calling in the area-code mode. While numerous format possibilities exist, as suggested above, access for callers in the area-code mode might be limited to a relatively short period of time. For example, a television program advertising the XYZ Widget might include a drawing to select the telephone terminals from which callers may participate for a period of twenty-four hours. As indicated above, the drawing might identify the last three digits of telephone numbers for the approved terminals.

Following a relatively short time (e.g. one day) during which area-code callers may enter the contest, the contest might be Concluded with the ultimate winner or winners determined. In any event, assume the presence of a caller at the terminal T2 with an approved telephone number, i.e. "212 627 2257". Somewhat as explained above with respect to other calling modes, keying operations by the caller at the remote terminal T2 result in a connection through the communication system CO to the audio response unit 20. As previously, the communication facility CO provides digital signals to the audio response unit 20 indicating the calling number (ANI). Thus, the calling number is registered as indicated by the block 62 in FIG. 2. As previously, in the event ANI equipment is not operative to serve the remote terminal T2, then the caller may be asked to key in his telephone number for subsequent verification.

From the audio response unit 20, the caller's number is supplied to the coincidence detector and storage unit 34 for a two-stage test. A first test simply seeks a coincidence between the approved number sequence (three digits) and the last three digits of the calling number. In the example, the last three digits of the calling number ("257") are compared with the select digit sequence, "257". The test is indicated by the query block 64 in FIG. 2.

As a secondary test, the unit 34 may check a record of previous use. Thus, the unit 34 simply implements test logic to accomplish these comparison-step operations with structures as well known in the prior art.

If the tests are negative, as indicated by the query block 64, the communication is aborted as indicated by the block 60. Alternatively, a favorable test again directs the system to proceed to the step of block 52 at which the process enters a common phase for all calling modes.

With the entry of a call into the common phase, the line carrying the call is connected through the coupler 24 (FIG. 1) to the interface processor 26. That is, depending on the call mode, the call is passed through one of the audio response units 18, 20 or 22 and the coupler 24 to the interface processor 26. Note that as indicated above, each of the audio response units 18, 20 and 22 is capable of accommodating a large number of asynchronous calls. Similarly, the coupler 24 is capable of connecting lines from the audio response units 18, 20 and 22 (LB1, LB2 and LB3 respectively) to the interface processor on an individual basis through lines 37 and 39.

The interface processor 26 may comprise a relatively substantial computing capability for processing many individual calls with programmed variations. The processing operation is illustrated in FIG. 2 beginning with the block 52. However, note that as the interface processor 26 receives the telephone number identifying a calling terminal (ANI) reference may be made to a data bank. Therefore, the operation might involve reference to substantial data on a caller. Accordingly, a basis exists for several process variations accommodated by data from a bank. The block 52 represents such possibilities as well as further informing or processing callers.

With the receipt of a call at the interface processor 26, a voice generator may be actuated to specifically inform a caller, depending upon the specific format employed. Essentially, digital signals are provided to actuate a voice generator within the processor 26. Accordingly, an audio message is provided through the coupler 24, the associated audio response unit, and the communication facility CO to the connected remote terminal. Thus, the caller may be further informed or cued.

In the disclosed embodiment, concurrently with the operation of further informing the caller, the interface processor 26 actuates the random number generator 40 to provide a random address for the question memory 38. The process step is illustrated in FIG. 2 by the block 66.

The random number (identifying a question in the memory 38) is also provided to the coincidence detector 42 to test for the previous use of the question to the calling terminal. In that regard, the interface processor 26 provides the caller telephone number (ANI) to the caller record 44 which may simply take the form of a look-up table addressed by calling numbers and revealing the identification of previous questions propounded. The addresses of questions previously recorded for a calling number are supplied to the coincidence detector 42 for comparison with the current tentative question identification number. The process step is illustrated by the query block 68 in FIG. 2.

If the tentative question has been previously used for the calling terminal, a signal is provided from the coincidence detector 42 to the interface processor prompting a repeat operation by the random number generator 40 to select another question.

Alternatively, if the tentative question is not a repeat, then the coincidence detector 42 qualifies the gate 46 and the tentative question is supplied to the interface processor 26 for actual use. Note that upon the occurrence,of an approved question, the coincidence detector also supplies a signal to the call ,record 44 which records the identification number of the question. The process step is illustrated in FIG. 2 by the block 70.

With the provision of signals representing a question through the gate 46 to the interface processor 26, the internal voice generator is actuated to propound the question to the caller. Recognizing the vast possibilities for contest formats, one or more rather difficult questions might be propounded to isolate lottery participants. Alternatively, a relatively easy question may be propounded as a minor obstacle to participation in the final phase of the contest. In any event, as prompted or cued, the caller responds using the buttons 14 and the response is registered for testing within the interface processor 26. The process steps are indicated by the block 72 and the query block 74 in FIG. 2. The results of the tests are then stored in the interface result memory 36. Note that in the interests of human perception, a printed record may be developed concurrently with the qualification of lottery participants.

Final processing to determine a winner or winners may involve any of various operations as a drawing, an event, and so on. Accordingly, as indicated by the blocks 76 and 78, final determinations are made of winners and losers with predetermined prize allocations. Thus, the system of the present invention enables effective regulation and control of interfaces between persons at telephone stations and a central processing apparatus. Calls in various modes are accommodated with appropriate tests, and interface data (e.g. test questions) are qualified.

In view of the above descriptions, it will be apparent that the disclosed embodiment is susceptible to considerable modification in the implementation of the present invention in conjunction with a telephone system to accommodate caller interface operations. Although the disclosed embodiment is directed to a contest, it will be apparent that aspects of the system may be variously embodied to accommodate any of a variety of telephone interface operations. Furthermore, it will be apparent that while the disclosed embodiment comprises specific elements and configurations, any of a variety of structures might well be utilized. Accordingly, the scope hereof is deemed to be as set forth in the claims below.

What is claimed is:

1. A telephone interface system for individually interfacing callers at a multitude of remote terminals for voice-digital communication through a telephone communication facility in accordance with an interface format, and involving digital signals including dialed number identification signals and calling number identification data provided automatically by said telephone communication facility, said system comprising:

communication means for receiving said dialed number identification signals to select said interface format from a plurality of formats and establishing telephone communication with currently active callers at certain of said multitude of remote terminals through said telephone communication facility;

means for receiving said calling number identification data for said callers and comparing against a database of stored calling number identification data;

means for providing identification signals to said communication means indicative of said currently active callers;

memory means for storing caller cues and use indications for said caller cues in relation to said callers as identified by said identification signals and answer data provided by said callers in response to said caller cues;

cue means for receiving said caller cues to provide voice signals through said communication means to prompt said answer data from said currently active of said callers in the form of digital data signals;

means for selecting a current caller cue from said memory means for one of said currently active callers for application to said cue means under control of said identification signals in order to prevent duplicate provision of a caller cue to a particular caller under control of said identification signals; and means for processing at least certain of said answer data provided by said callers.

2. A telephone call processing system for receiving calls from a multitude of terminals in different call modes including a "900" caller-charge call mode and at least an "800" toll free call mode for processing to an interface format and involving digital signals including digital signals indicative of DNIS, said system comprising:

first response unit for receiving calls in said "900" caller-charge call mode under control of DNIS for processing to common operations of said interface format;

second response unit for receiving calls in said "800" toll free call mode under control of DNIS for processing to common operations of said interface format;

voice generator means for providing different automated greetings under control of DNIS to callers calling in said "900" caller-charge call mode and callers calling in said "800" toll free call mode and prompting said callers calling in at least said "800" call mode to enter data; and processing means for processing at least certain of said data entered by said callers.

3. A telephone call processing system according to claim 2, further comprising:

qualification means for testing for approval at least certain of the data entered by the callers calling in said "800" toll free call mode.

4. A telephone call processing system according to claim 3, wherein said at least certain of the data entered by the callers is further tested against a record of previous use.

5. A telephone call processing system according to claim 3, wherein said qualification means further implements a test with respect to a limit on a period of time.

6. A telephone call processing system according to claim 5, wherein said at least certain data entered by the callers is further tested against a record of previous use.

7. A telephone call processing system according to claim 2, wherein said processing means processes at least certain of said data entered by said callers to isolate a subset of callers.

8. A telephone call processing system according to claim 7, wherein said processing means processes on-line at least certain of said data entered by said callers to isolate a subset of callers.

9. A telephone call processing system according to claim 2, wherein said interface format is an information service format.

10. A telephone call processing system according to claim 2, wherein said first response unit and said second response unit are incorporated within a single composite unit.

11. A telephone interface system for individually interfacing callers at a multitude of remote terminals for voice-digital communication through a telephone communication facility in accordance with an interface format, and involving digital signals including dialed number identification signals provided automatically by said telephone control of said identification signals; and means for processing at least certain of said answer data provided by said callers.

12. A telephone interface system according to claim 11, wherein said comparing means receives data entered by the callers as at least a part of said identification signals and tests the data entered by the callers for approval.

13. A telephone interface system according to claim 12, wherein said comparing means further implements a test based upon a limited period of time.

14. A telephone interface system according to claim 12, wherein said comparing means further tests the data entered by the callers against a record of previous use.

15. A telephone interface system according to claim 11, wherein said interface format is an information service format.

16. A telephone interface system according to claim 11, wherein said means for processing processes at least certain of said answer data provided by said callers to isolate a subset of callers.

17. A telephone interface system according to claim 16, wherein said means for processing processes on-line at least certain of said answer data to isolate a subset of callers.

18. A telephone interface system for individually interfacing callers at a multitude of remote terminals for voice-digital communication through a telephone communication facility, said system comprising:

communication means for establishing telephone communication between callers at certain of said multitude of remote terminals and a select data format selected from a plurality of data formats through said telephone communication facility based on digital signals (DNIS) automatically provided by said telephone communication facility to access said select data format; said select format in one form thereof preventing duplication of caller cues;

means for providing identification signals to said communication means indicative of currently active of said callers;

memory means for storing one or more caller cues and use indications for said caller cues in relation to said currently active of said callers as identified by said identification signals;

cue means for receiving said caller cues to provide responses from said currently active callers in the form of digital data signals; and means for selecting a caller cue from said memory means for said currently active caller for application to said cue means under control of said identification signals and said use indications stored in said memory means for said currently active caller whereby to limit and control caller cues provided to individual callers based upon cues previously provided to and identified with said individual callers.

19. A telephone call processing system for receiving calls through a telephonic communication facility from a multitude of terminals in a toll free call mode such as an "1800" call mode for processing data in accordance with an operating process format and involving digital signals including DNIS signals, said system comprising:

receiving structure for receiving calls in different call modes wherein digital signals indicative of dialed numbers identify at least two of a plurality of toll free called numbers and a plurality of caller charge called numbers;

voice generator coupled to said receiving structure for prompting callers whereby callers enter data in response to voice prompts:

connection structure for connecting substantially all of said callers calling at least two of said plurality of toll free called numbers and said caller charge called numbers to a common phase of an interface format; and audio control unit coupled to said communication means for providing distinct automated greetings to callers calling at least two of said plurality of toll free called numbers and said caller charge called numbers under control of said digital signals including DNIS signals prior to connection to said common phase of said interface format.

20. A telephone call processing system according to claim 19, further comprising:

means for processing data entered by said callers to isolate a subset of callers.

21. A telephone call processing system according to claim 19, further comprising:

memory for storing certain data provided by said callers.

22. A telephone call processing system according to claim 19, wherein said receiving structure receives select digits of caller telephone numbers automatically provided by digital signals from said telephonic communication facility.

23. A telephone call processing system according to claim 22, further comprising:
   memory for storing said select digits of caller telephone numbers.

24. A telephone call processing system according to claim 19, wherein said interface format is one of a plurality of formats selected under control of said DNIS signals.

25. A telephone call processing system according to claim 19, further comprising, qualification structure for testing caller identification data entered during calls calling at least two of said plurality of toll free called numbers.

26. A telephone call processing system according to claim 25, wherein said qualification structure further implements a test based on a limited period of time.

27. A telephone call processing system according to claim 25, wherein said qualification structure further tests the caller identification data against a record of previous use.

28. A telephone call processing system for receiving calls through a telephonic communication facility from a multitude of terminals in a toll free call mode for processing data in accordance with an operating process format and involving digital signals including called number identification signals (DNIS) automatically provided by said telephonic communication facility, said system comprising:
   first response unit means for receiving calls in said toll free call mode wherein said called number identification signals (DNIS) indicative of at least one of a plurality of distinct called numbers identifies said operating process format;
   voice generator means for prompting callers to enter data in response to voice prompts wherein said data entered by said callers is used to update data for said callers in a database relating to said callers;
   qualification means for qualifying at least said calls utilizing said one of said plurality of distinct called numbers in said toll free call mode received by said first response unit to provide qualified calls based upon a test of caller entered identification data including caller pin-number data based upon limited use;
   second response unit means for receiving calls in said toll free call mode wherein called number identification signals (DNIS) indicative of one other of said plurality of distinct called numbers identifies said operating process format;
   means for concurrently processing calls received by said first response unit means and said calls received by said second response unit for concurrent processing of data in accordance with common operations of said operating process format.

29. A telephone call processing system according to claim 28, further comprising:
   audio control unit for providing an automated greeting under the control of said called number identification signals (DNIS) to callers calling at least one of said distinct called numbers whereby said automated greeting is specific to said one of said plurality of distinct numbers; and
   a third response unit means for receiving calls in an area code call mode, said calls received by said third response unit means concurrently processed with said calls received by said first and second response unit means in accordance with said common operations of said select operating process format.

30. A telephone call processing system according to claim 29, wherein said select operating process format is one selected from a plurality of distinct operating process formats.

31. A telephone call processing system according to claim 28, wherein said select interface format is one selected from a plurality of distinct operating process formats.

32. A telephone call processing system according to claim 28, wherein said means for concurrently processing processes data provided by callers to update a databank relating to said callers.

33. A telephone call processing system according to claim 28, wherein said means for concurrently processing comprises multiple comparative processing operations to isolate a subset of callers.

34. A telephone call processing system according to claim 28, wherein at least select digits of caller telephone numbers are automatically provided by digital signals from the telephonic communication facility.

35. A telephone call processing system according to claim 28 wherein said first response unit means and said second response unit means are incorporated within a single composite unit.

36. A telephone call processing system for receiving calls from a multitude of terminals for processing to an interface format and involving digital signals including digital signals associated with said terminals as for identification or data, said system comprising:
   cue means for prompting responses to questions, from said terminals in the form of digital signals as data;
   question selection means for selecting individual questions from a plurality of questions for actuating said cue means, said selection means including a random selection means to select said individual questions;
   test means for testing individual questions as correct or incorrect;
   processing means to process responses to said individual questions to isolate a subset of callers; and
   memory means for storing data and control means for restricting the extent of access to said system based on at least one of caller provided data or calling terminal data automatically provided by said telephonic communication facility.

37. A telephone call processing system for receiving calls through a telephonic communication facility from a multitude of terminals in a pay to dial call mode for processing data in accordance with any of a plurality of operating process formats and involving digital signals including DNIS, said system comprising:
   first response unit means for receiving calls in said pay to dial call mode wherein digital signals indicative of at least one of a plurality of distinct called numbers (DNIS) identify one of said plurality of operating process formats;
   voice generator means for prompting callers whereby said callers enter data in response to voice prompts;
   qualification means for qualifying at least said calls utilizing said one of said plurality of distinct called numbers (DNIS) in said toll free call mode received by said first response unit to provide qualified calls;
   second response unit means for receiving calls in said pay to dial call mode wherein digital signals indicative of one other of said plurality of distinct called numbers (DNIS) identify another of said plurality of operating process formats;
   means for processing calls received by said first response unit means and said calls received by said second response unit for concurrent processing of data in accordance with certain common processing operations of said one and said another of said operating process formats.

38. A telephone call processing system according to claim 37, further comprising:
audio control unit for providing an automated greeting under the control of said DNIS to callers calling at least one of said distinct called numbers whereby said automated greeting is specific to said pay to dial mode.

39. A telephone call processing system according to claim 37, wherein said voice generator means prompts responses to at least one question in the form of interactively entered data provided by said callers calling at least one of said distinct called numbers; and said system further comprises:
means for storing said interactively entered data.

40. A telephone call processing system according to claim 37, further comprising:
means for providing identification signals to said qualification means indicative of currently active of said callers;
memory means for storing one or more caller cues and use indications for said caller cues in relation to said currently active of said callers as identified by said identification signals;
cue means for receiving said caller cues to provide responses from said currently active callers in the form of digital data signals; and
means for selecting a caller cue from said memory means for said currently active caller for application to said cue means under control of said identification signals and said use indications stored in said memory means for said currently active caller whereby to limit and control caller cues provided to individual callers based upon cues previously provided to and identified with said individual callers.

41. A telephone call processing system according to claim 37, wherein said means for processing calls processes caller entered data to isolate a subset of said callers.

42. A telephone call processing system according to claim 37, wherein said means for processing calls utilizes multiple comparative processing operations to isolate said subset of callers.

43. A telephone call processing system according to claim 37, wherein said one of said plurality of operating processing formats is a form of an information service format.

44. A telephone call processing system according to claim 37, wherein said means for processing calls isolates a subset of callers based upon data entered by said callers responsive to prompting by said voice generator means and wherein said means for processing calls further isolates a sub-subset of callers also responsive to further data entered by said callers responsive to further prompting by said voice generator means.

45. A telephone call processing system according to claim 37, wherein qualification by said qualification means of said calls includes qualification of caller provided identification data.

46. A telephone call processing system according to claim 37, wherein said pay to dial call mode is a "900" call mode.

47. A telephone call processing system according to claim 37, further comprising:
audio control unit for providing a preliminary automated greeting under the control of said DNIS to callers calling at least one of said distinct called numbers whereby said preliminary automated greeting is specific to said one of said plurality of distinct numbers and prior to execution of common operations of said one operating process format.

48. A telephone call processing system according to claim 37, wherein said system further receives calls with respect to another operating process format accessed in a toll free mode under control of said DNIS.

49. A telephone call processing system according to claim 48, wherein said toll free mode is an 800 number.

50. A telephone call processing system according to claim 49, wherein said callers to said toll free number provide qualification data.

51. A telephone call processing system according to claim 49, wherein said qualification number is tested for a use limit.

52. A telephone call processing system according to claim 37, wherein qualification means tests data entered by the callers for approval.

53. A telephone call processing system according to claim 52, wherein the qualification means further tests the data entered by the callers against a record of previous use.

54. A telephone call processing system according to claim 52, wherein the qualification means further implements a test with respect to a limited period of time.

55. A telephone call processing system according to claim 37, wherein said first response unit means and said second response unit means are incorporated within a single composite unit.

56. A process for interfacing, through a telephone-communication facility, (1) callers who are at a multitude of remote terminals for voice-digital communication with (2) a system for prompting the callers with caller cues, said process comprising the steps of:
establishing telephone communications between the callers and the system. the system having a receiving unit for receiving digital signals including dialed-number identification signals provided automatically from the telephone-communication facility;
utilizing the dialed-number identification signals to identify one from a plurality of numbers dialed by the callers;
also receiving at the receiving unit identification signals relating to the callers;
testing said identification signals relating to the callers to determine whether to qualify the callers for access to at least a portion of operations of the system;
utilizing, for qualified callers, the identification signals relating to the callers, to avoid prompting certain callers with a certain previously provided cue or cues; and
providing to the qualified callers at least one other caller cue.

57. A process according to claim 56, wherein the identification signals relating to the callers comprise a number entered by each of the callers to determine if that caller is eligible to participate.

58. A process according to claim 56, wherein the process further implements a test with respect to a limit on a period of time.

59. A process according to claim 56, wherein during the testing step, the number entered by the caller is further tested to determine if it has exceeded a limit on extent of access, during a limited period to time.

60. A process according to claim 56, wherein during the testing step, the process further tests the identification signals against a record of previous use.

61. A process according to claim 56, wherein the identification signals relating to the callers are calling number identification signals automatically provided by the telephone-communication facility.

62. A process according to claim 56, further comprising the step of:

processing, to isolate a subset of callers, caller-response signals responsive to certain of the plurality of caller cues.

63. A process according to claim 62, wherein during the processing step, the response signals are processed on-line.

64. A process according to claim 62, wherein during the processing step, the response signals are processed off-line.

65. A process according to claim 56, wherein the dialed-number identification signals identify both "800" and "900" called numbers.

66. A process according to claim 56, further comprising the step of: selecting from a plurality of operating process formats, utilizing the dialed-number identification signals received from the telephone-communication facility, a select format.

67. A process for interfacing, through a telephone-communication facility, (1) callers who are at a multitude of remote terminals for voice-digital communication with (2) a system for prompting the callers with caller cues, said process comprising the steps of:

receiving identification signals at a receiving unit of the system, the identification signals indicating telephone numbers of the multitude of remote terminals, the identification signals being automatically provided by the telephone-communication facility;

testing, to determine whether to qualify the callers for voice-digital communication with the system, the identification signals that indicate the telephone numbers;

utilizing, for qualified callers, the identification signals that indicate the telephone numbers to avoid prompting certain callers with a certain previously provided cue or cues; and providing to the qualified callers at least one other caller cue.

68. A process according to claim 67, wherein during the testing step, the process further tests, against a record of previous use, the identification signals.

69. A process according to claim 67, wherein during the receiving step, the receiving unit also receives called-number identification signals that are automatically provided by the telephone-communication facility, and utilizing the called-number identification signals to identify a select format from a plurality of formats.

70. A process according to claim 69, further comprising the step of:

testing the identification signals that indicate the telephone number, to determine whether to qualify the callers to access the select format, by testing to determine whether each caller has exceeded a limit on use; and further implementing a test based on a limit on a period of time.

71. A process according to claim 69, wherein the called-number identification signals identify both "800" and "900" called numbers.

72. A process according to claim 67, further implementing a test with respect to a limit on a period of time.

73. A process according to claim 67, further comprising the step of:

processing, to isolate a subset of callers, response signals provided by the callers in response to certain of the plurality of caller cues with which the callers are prompted.

74. A process according to claim 73, wherein during the processing step, the response signals are processed on-line.

75. A process according to claim 73, wherein during the processing step, the response signals are processed off-line.

76. A process for interfacing, through a telephone-communication facility, (1) callers who are at a multitude of remote terminals for voice-digital communication with (2) a system for prompting the callers with caller cues, said process comprising the steps of:

receiving, at a receiving unit of the system, identification signals relating to the callers that include (a) calling signals indicating telephone numbers of the multitude of remote terminals, the calling signals being automatically provided by the telephone-communication facility and (b) signals that represent data entered by the callers at the multitude of remote terminals;

testing the identification signals relating to the callers to determine whether to qualify the individual callers to use all or part of the process, by testing to determine if the calling signals indicating each of the telephone numbers indicate a valid identification number for each caller that has not exceeded a limit on use, and by further implementing a test based on a predetermined period of time;

utilizing for qualified callers, to avoid prompting certain callers with a certain previously provided cue or cues, the calling signals that indicate the telephone numbers; and providing to the qualified callers at least one other caller cue.

77. A process according to claim 76, further comprising the step of:

also receiving called-number identification signals that are automatically provided by the telephone-communication facility; and utilizing the called-number identification signals to select a format from a plurality of formats and connecting the callers at the multitude of remote terminals with the format.

78. A process according to claim 77, wherein the plurality of formats are accessed by both 800 and 900 calling modes, callers entering data in response to the caller cues with which they are prompted.

79. A process according to claim 76, further comprising the step of:

processing, to isolate a subset of callers, the data entered by the callers in response to caller cues.

80. A process according to claim 79, wherein during the processing step, the data entered by the callers is processed on-line.

81. A process according to claim 76, wherein the limit on use is one.

* * * * *

UNITED STATES PATENT AND TRADEMARK OFFICE
CERTIFICATE OF CORRECTION

PATENT NO.   : 5,974,120
DATED        : October 26, 1999
INVENTOR(S)  : Ronald A. Katz Page 1 of 1

It is certified that error appears in the above-identified patent and that said Letters Patent is hereby corrected as shown below:

Column 4,
Line 60, "IDNIS" should be -- DNIS --.

Column 5,
Line 38, "the, current" should be -- the current --.
Line 57, "erg." should be -- e.g. --.

Column 7,
Line 6, "thelaudio" should be -- the audio --.

Column 8,
Line 16, "Concluded" should be -- concluded --.
Line 66, "toga" should be -- to a --.

Column 12, claim 19,
Line 32, "1800" should be -- 800 --.

Column 16, claim 59,
Line 58, "to" should be -- of --.

Signed and Sealed this

Twenty-sixth Day of March, 2002

Attest:

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO.     : 5,974,120
DATED          : October 26, 1999
INVENTOR(S)    : Ronald A. Katz It is certified that error appears in the above-identified patent and that said Letters Patent is hereby corrected as shown below:

<u>Column 11,</u>
Line 42, delete "control of".
Line 43, delete "said identification signals; and" and insert the following:

-- communication facility, said system comprising:
  communication means for receiving said dialed number identification signals to select said interface format from a plurality of formats and establishing telephone communication with currently active callers at certain of said multitude of remote terminals through said telephone communication facility;
  means for providing identification signals to said communication means indicative of said currently active callers;
  means for comparing said identification signals against a database of stored identification data;
  memory means for storing caller cues and use indications for said caller cues in relation to said callers as identified by said identification signals and additional answer data provided by said callers in response to caller cues;
  cue means for receiving said caller cues to provide voice signals through said communication means to prompt said answer data from said currently active of said callers in the form of digital data signals;
  means for selecting a current caller cue from said memory means for one of said currently active callers for application to said cue means under control of said identification signals in order to prevent duplicate provision of a caller cue to a particular caller under control of said identification signals; and --.

Signed and Sealed this

Sixth Day of August, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO. : 5,974,120 Page 1 of 1
DATED : October 26, 1999
INVENTOR(S) : Ronald A. Katz It is certified that error appears in the above-identified patent and that said Letters Patent is hereby corrected as shown below:

<u>Column 16,</u>
Line 52, after "according to claim" please delete "56" and replace with the following:
-- 57 --

Signed and Sealed this

Twenty-sixth Day of November, 2002

Attest:

JAMES E. ROGAN
Attesting Officer  Director of the United States Patent and Trademark Office

UNITED STATES PATENT AND TRADEMARK OFFICE
CERTIFICATE OF CORRECTION

PATENT NO. : 5,974,120 Page 1 of 1
DATED : October 26, 1999
INVENTOR(S) : Ronald A. Katz It is certified that error appears in the above-identified patent and that said Letters Patent is hereby corrected as shown below:

Column 16,
Line 55, after "according to claim" please delete "56" and replace with the following -- 57 --

This certificate supersedes Certificate of Correction issued November 26, 2002.

Signed and Sealed this

Twenty-sixth Day of October, 2004

JON W. DUDAS
*Director of the United States Patent and Trademark Office*

US005974120C1

(12) EX PARTE REEXAMINATION CERTIFICATE (10105th)
United States Patent
Katz

(10) Number: US 5,974,120 C1
(45) Certificate Issued: *Apr. 9, 2014

(54) TELEPHONE INTERFACE CALL PROCESSING SYSTEM WITH CALL SELECTIVITY

(75) Inventor: Ronald A. Katz, Los Angeles, CA (US)

(73) Assignee: General Electric Capital Corporation, Atlanta, GA (US)

Reexamination Request:
No. 90/008,229, Sep. 20, 2006
No. 90/010,044, Nov. 5, 2007
No. 90/010,130, Mar. 28, 2008

Reexamination Certificate for:
Patent No.: 5,974,120
Issued: Oct. 26, 1999
Appl. No.: 08/480,185
Filed: Jun. 7, 1995

Certificate of Correction issued Mar. 26, 2002
Certificate of Correction issued Aug. 6, 2002
Certificate of Correction issued Nov. 26, 2002
Certificate of Correction issued Oct. 26, 2004

( * ) Notice: This patent is subject to a terminal disclaimer.

Related U.S. Application Data

(63) Continuation of application No. 08/132,062, filed on Oct. 4, 1993, now Pat. No. 5,828,734, which is a
(Continued)

(51) Int. Cl.
*H04Q 3/66* (2006.01)
*H04Q 3/72* (2006.01)
*H04Q 3/74* (2006.01)
*G07C 11/00* (2006.01)
*G07C 15/00* (2006.01)
*H04M 3/36* (2006.01)
*H04M 3/38* (2006.01)
*H04M 3/436* (2006.01)
*H04M 3/46* (2006.01)
*H04M 3/493* (2006.01)
*H04M 3/51* (2006.01)
*H04M 11/00* (2006.01)
*H04Q 3/00* (2006.01)
*H04Q 3/545* (2006.01)
*H04Q 3/64* (2006.01)
*H04M 3/42* (2006.01)
*H04M 3/50* (2006.01)
*H04M 3/487* (2006.01)

(52) U.S. Cl.
USPC .................. 379/93.13; 379/93.02; 379/93.12

(58) Field of Classification Search
None
See application file for complete search history.

(56) References Cited

To view the complete listing of prior art documents cited during the proceedings for Reexamination Control Numbers 90/008,229, 90/010,044, and 90/010,130, please refer to the USPTO's public Patent Application Information Retrieval (PAIR) system under the Display References tab.

*Primary Examiner* — Erik Kielin

(57) ABSTRACT

For use with a public telephone network CO incorporating a vast number of terminals Tl-Tn, a system CS limits and controls interface access to implement voice-digital communication for statistical processing. The system CS accommodates calls in different modes; e.g. "800", "900" or area code and incorporates qualifying apparatus to restrict against caller misuse. Alternative calling modes are used to reach an interface facility that also affords some control based on calling terminal identification, e.g. as by ANI equipment.

At the time of issuance and publication of this certificate, the patent remains subject to pending reexamination control number 90/012,400 filed Jul. 20, 2012. The claim content of the patent may be subsequently revised if a reexamination certificate issues from the reexamination proceeding.

Related U.S. Application Data continuation of application No. 07/779,762, filed on Oct. 21, 1991, now Pat. No. 5,251,252, which is a continuation of application No. 07/425,779, filed on Oct. 23, 1989, now Pat. No. 5,128,984, which is a continuation-in-part of application No. 07/312,792, filed on Feb. 21, 1989, now Pat. No. 5,073,929, which is a continuation-in-part of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned, said application No. 08/132,062 is a continuation-in-part of application No. 08/306,751, filed on Sep. 14, 1994, which is a continuation of application No. 08/047,241, filed on Apr. 13, 1993, now Pat. No. 5,351,285, which is a continuation of application No. 07/509,691, filed on Apr. 16, 1990, now abandoned, and a continuation-in-part of application No. 07/640,337, filed on Jan. 11, 1991, which is a continuation of application No. 07/335,923, filed on Apr. 10, 1989, which is a continuation of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned, said application No. 07/509,691 is a continuation-in-part of application No. 07/260,104, filed on Oct. 20, 1988, now Pat. No. 4,930,150, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 28, 34, 56, 57, 62, 67 and 73 are cancelled.

Claims 1-27, 29-33, 35-55, 58-61, 63-66, 68-72 and 74-81 were not reexamined.

* * * * *

(12) EX PARTE REEXAMINATION CERTIFICATE (10283rd)
United States Patent
Katz

(10) Number: US 5,974,120 C2
(45) Certificate Issued: *Sep. 2, 2014

(54) TELEPHONE INTERFACE CALL PROCESSING SYSTEM WITH CALL SELECTIVITY

(75) Inventor: Ronald A. Katz, Los Angeles, CA (US)

(73) Assignee: General Electric Capital Corporation, Atlanta, GA (US)

Reexamination Request:
No. 90/012,400, Jul. 20, 2012

Reexamination Certificate for:
| | |
|---|---|
| Patent No.: | 5,974,120 |
| Issued: | Oct. 26, 1999 |
| Appl. No.: | 08/480,185 |
| Filed: | Jun. 7, 1995 |

Reexamination Certificate C1 5,974,120 issued Apr. 9, 2014

Certificate of Correction issued Mar. 26, 2002
Certificate of Correction issued Aug. 6, 2002
Certificate of Correction issued Nov. 26, 2002
Certificate of Correction issued Oct. 26, 2004

( * ) Notice: This patent is subject to a terminal disclaimer.

Related U.S. Application Data

(63) Continuation of application No. 08/132,062, filed on Oct. 4, 1993, now Pat. No. 5,828,734, which is a (Continued)

(51) Int. Cl.
| | |
|---|---|
| *G07C 15/00* | (2006.01) |
| *G07C 11/00* | (2006.01) |
| *H04M 11/00* | (2006.01) |
| *H04Q 3/74* | (2006.01) |
| *H04Q 3/64* | (2006.01) |
| *H04M 3/493* | (2006.01) |
| *H04Q 3/66* | (2006.01) |
| *H04M 3/51* | (2006.01) |
| *H04M 3/487* | (2006.01) |
| *H04M 3/46* | (2006.01) |
| *H04M 3/50* | (2006.01) |
| *H04Q 3/72* | (2006.01) |
| *H04M 3/36* | (2006.01) |
| *H04Q 3/00* | (2006.01) |
| *H04Q 3/545* | (2006.01) |
| *H04M 3/38* | (2006.01) |
| *H04M 3/436* | (2006.01) |
| *H04M 3/42* | (2006.01) |

(52) U.S. Cl.
USPC .................. 379/93.13; 379/93.02; 379/93.12

(58) Field of Classification Search
None
See application file for complete search history.

(56) References Cited

To view the complete listing of prior art documents cited during the proceeding for Reexamination Control Number 90/012,400, please refer to the USPTO's public Patent Application Information Retrieval (PAIR) system under the Display References tab.

*Primary Examiner* — Stephen J Ralis

(57) ABSTRACT

For use with a public telephone network CO incorporating a vast number of terminals T1-Tn, a system CS limits and controls interface access to implement voice-digital communication for statistical processing. The system CS accommodates calls in different modes; e.g. "800", "900" or area code and incorporates qualifying apparatus to restrict against caller misuse. Alternative calling modes are used to reach an interface facility that also affords some control based on calling terminal identification, e.g. as by ANI equipment.

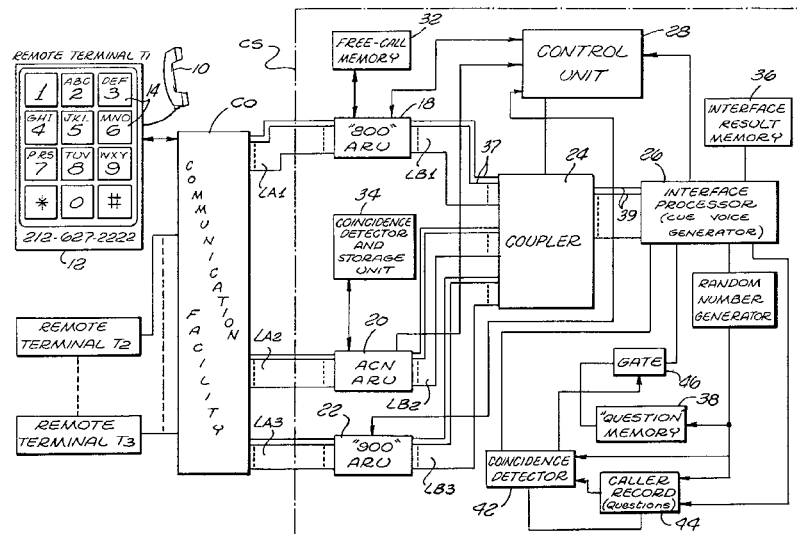

Related U.S. Application Data continuation of application No. 07/779,762, filed on Oct. 21, 1991, now Pat. No. 5,251,252, which is a continuation of application No. 07/425,779, filed on Oct. 23, 1989, now Pat. No. 5,128,984, which is a continuation-in-part of application No. 07/312,792, filed on Feb. 21, 1989, now Pat. No. 5,073,929, which is a continuation-in-part of application No. 07/194,258, filed on May 16, 1988, now Pat. No. 4,845,739, which is a continuation-in-part of application No. 07/018,244, filed on Feb. 24, 1987, now Pat. No. 4,792,968, which is a continuation-in-part of application No. 06/753,299, filed on Jul. 10, 1985, now abandoned, said application No. 08/132,062 is a continuation-in-part of application No. 08/306,751, filed on Sep. 14, 1994, which is a continuation of application No. 08/047,241, filed on Apr. 13, 1993, now Pat. No. 5,351,285, which is a continuation of application No. 07/509,691, filed on Apr. 16, 1990, now abandoned, and a continuation-in-part of application No. 07/640,337, filed on Jan. 11, 1991, which is a continuation of application No. 07/335,923, filed on Apr. 10, 1989, which is a continuation of application No. 07/194,258, which is a continuation-in-part of application No. 07/018,244, which is a continuation-in-part of application No. 06/753,299, said application No. 07/509,691 is a continuation-in-part of application No. 07/260,104, filed on Oct. 20, 1988, now Pat. No. 4,930,150, which is a continuation-in-part of application No. 07/018,244, which is a continuation-in-part of application No. 06/753,299.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 28, 34, 56, 57, 62, 67 and 73 were previously cancelled.

Claim 61 is cancelled.

Claims 1-27, 29-33, 35-55, 58-60, 63-66, 68-72 and 74-81 were not reexamined.

\* \* \* \* \*